United States Patent
Nazarpoor et al.

(10) Patent No.: US 9,545,626 B2
(45) Date of Patent: Jan. 17, 2017

(54) OPTIMIZATION OF ZERO-PGM WASHCOAT AND OVERCOAT LOADINGS ON METALLIC SUBSTRATE

(71) Applicant: Clean Diesel Technologies, Inc., Oxnard, CA (US)

(72) Inventors: Zahra Nazarpoor, Camarillo, CA (US); Sen Kitazumi, Oxnard, CA (US); Johnny T. Ngo, Oxnard, CA (US)

(73) Assignee: Clean Diesel Technologies, Inc., Oxnard, CA (US)

( * ) Notice: Subject to any disclaimer, the term of this patent is extended or adjusted under 35 U.S.C. 154(b) by 248 days.

(21) Appl. No.: 13/941,015

(22) Filed: Jul. 12, 2013

(65) Prior Publication Data
US 2015/0018203 A1    Jan. 15, 2015

(51) Int. Cl.
*B01J 23/72* (2006.01)
*B01J 37/02* (2006.01)
(Continued)

(52) U.S. Cl.
CPC .......... *B01J 37/0244* (2013.01); *B01D 53/944* (2013.01); *B01J 23/50* (2013.01); *B01J 23/72* (2013.01); *B01J 23/83* (2013.01); *B01D 2255/104* (2013.01); *B01D 2255/2065* (2013.01); *B01D 2255/20707* (2013.01);
(Continued)

(58) Field of Classification Search
CPC .............. B01D 53/944; B01D 2255/65; B01D 2255/20761; B01D 2255/908; B01D 2255/2065; B01D 2255/20715; B01D 2255/104; B01D 2255/9022; B01D 2255/20707; B01J 23/72; B01J 23/50; B01J 23/83
(Continued)

(56) References Cited

U.S. PATENT DOCUMENTS 3,284,370 A    11/1966    Alan et al.
3,473,987 A    10/1969    Sowards
(Continued)

FOREIGN PATENT DOCUMENTS

CH    644637 A5    8/1984
CN    102172527    9/2011
(Continued)

OTHER PUBLICATIONS

K. S. Abdel Halim et al. "Catalytic Oxidation of CO Gas over Nanocrystallite $Cu_xMn_{1-x}Fe_2O_4$", Feb. 26, 2008, Top Catalyst (2008) 47:66-72.
(Continued)

*Primary Examiner* — Colleen Dunn
*Assistant Examiner* — Haytham Soliman
(74) *Attorney, Agent, or Firm* — Alston & Bird LLP

(57) ABSTRACT

The present disclosure refers to a plurality of process employed for optimization of Zero-PGM washcoat and overcoat loadings on metallic substrates. According to an embodiment a substantial increase in conversion of HC and CO may be achieved by optimizing the total washcoat and overcoat loadings of the catalyst. According to another embodiment, the present disclosure may provide solutions to determine the optimum total washcoat and overcoat loadings for minimizing washcoat adhesion loss. As a result, may increase the conversion of HC and CO from discharge of exhaust gases from internal combustion engines, optimizing performance of Zero-PGM catalyst systems.

14 Claims, 4 Drawing Sheets

(51) Int. Cl.
*B01J 23/50* (2006.01)
*B01J 23/83* (2006.01)
*B01D 53/94* (2006.01)

(52) U.S. Cl.
CPC .............. *B01D 2255/20715* (2013.01); *B01D 2255/20761* (2013.01); *B01D 2255/65* (2013.01); *B01D 2255/908* (2013.01); *B01D 2255/9022* (2013.01)

(58) Field of Classification Search
USPC ....... 502/355, 341, 331, 100, 350, 340, 304, 502/349, 352, 232, 319, 321, 320, 322, 502/60, 324, 332, 337, 338, 336, 346, 502/353, 348, 354; 423/210
See application file for complete search history.

(56) References Cited

U.S. PATENT DOCUMENTS

| | | |
|---|---|---|
| 3,493,325 A | 2/1970 | Roth |
| 3,896,616 A | 7/1975 | Keith et al. |
| 3,904,553 A | 9/1975 | Campbell et al. |
| 4,029,738 A | 6/1977 | Courty et al. |
| 4,062,810 A | 12/1977 | Vogt et al. |
| 4,113,921 A | 9/1978 | Goldstein et al. |
| 4,188,309 A | 2/1980 | Volker et al. |
| 4,199,328 A | 4/1980 | Cole et al. |
| 4,261,862 A | 4/1981 | Kinoshita et al. |
| 4,274,981 A | 6/1981 | Suzuki et al. |
| 4,297,150 A | 10/1981 | Sims et al. |
| 4,297,328 A | 10/1981 | Ritscher et al. |
| 4,414,023 A | 11/1983 | Aggen et al. |
| 4,629,472 A | 12/1986 | Haney, III et al. |
| 4,661,329 A | 4/1987 | Suzuki et al. |
| 4,673,556 A | 6/1987 | McCabe et al. |
| 4,790,982 A | 12/1988 | Yoo et al. |
| 4,797,329 A | 1/1989 | Kilbane et al. |
| 4,885,269 A | 12/1989 | Cyron |
| 4,891,050 A | 1/1990 | Bowers et al. |
| 4,892,562 A | 1/1990 | Bowers et al. |
| 4,906,443 A | 3/1990 | Gandhi et al. |
| 5,034,020 A | 7/1991 | Epperly et al. |
| 5,063,193 A | 11/1991 | Bedford et al. |
| 5,157,007 A | 10/1992 | Domesle et al. |
| 5,162,284 A | 11/1992 | Soled et al. |
| 5,168,836 A | 12/1992 | Kraus |
| 5,175,132 A | 12/1992 | Ketcham et al. |
| 5,182,249 A | 1/1993 | Wang et al. |
| 5,203,166 A | 4/1993 | Miller |
| 5,238,898 A | 8/1993 | Han et al. |
| 5,266,083 A | 11/1993 | Peter-Hoblyn et al. |
| 5,364,517 A | 11/1994 | Dieckmann et al. |
| 5,371,056 A | 12/1994 | Leyrer et al. |
| 5,404,841 A | 4/1995 | Valentine |
| 5,501,714 A | 3/1996 | Valentine et al. |
| 5,535,708 A | 7/1996 | Valentine |
| 5,580,553 A | 12/1996 | Nakajima |
| 5,584,894 A | 12/1996 | Peter-Hoblyn et al. |
| 5,658,543 A | 8/1997 | Yoshida et al. |
| 5,693,106 A | 12/1997 | Peter-Hoblyn et al. |
| 5,708,233 A | 1/1998 | Ochi et al. |
| 5,721,188 A | 2/1998 | Sung et al. |
| 5,732,548 A | 3/1998 | Peter-Hoblyn et al. |
| 5,743,922 A | 4/1998 | Peter-Hoblyn et al. |
| 5,747,410 A | 5/1998 | Muramatsu et al. |
| 5,749,928 A | 5/1998 | Epperly et al. |
| 5,809,774 A | 9/1998 | Peter-Hoblyn et al. |
| 5,809,775 A | 9/1998 | Tarabulski et al. |
| 5,819,529 A | 10/1998 | Peter-Hoblyn et al. |
| 5,868,421 A | 2/1999 | Eyrainer |
| 5,879,645 A | 3/1999 | Park et al. |
| 5,898,015 A | 4/1999 | Yokoi et al. |
| 5,921,080 A | 7/1999 | Ulmet et al. |
| 5,924,280 A | 7/1999 | Tarabulski |
| 5,939,354 A | 8/1999 | Golden |
| 5,965,099 A | 10/1999 | Hartweg et al. |
| 5,968,462 A | 10/1999 | Suzuki |
| 5,968,464 A | 10/1999 | Peter-Hoblyn et al. |
| 5,976,475 A | 11/1999 | Peter-Hoblyn et al. |
| 5,977,017 A | 11/1999 | Golden |
| 6,003,303 A | 12/1999 | Peter-Hoblyn et al. |
| 6,023,928 A | 2/2000 | Peter-Hoblyn et al. |
| 6,051,040 A | 4/2000 | Peter-Hoblyn et al. |
| 6,063,350 A | 5/2000 | Tarabulski et al. |
| 6,124,130 A | 9/2000 | Olson |
| 6,129,834 A | 10/2000 | Peters et al. |
| 6,203,770 B1 | 3/2001 | Peter-Hoblyn et al. |
| 6,232,253 B1 | 5/2001 | Narula et al. |
| 6,279,603 B1 | 8/2001 | Czarnik et al. |
| 6,293,096 B1 | 9/2001 | Khair et al. |
| 6,352,955 B1 | 3/2002 | Golden |
| 6,361,754 B1 | 3/2002 | Peter-Hoblyn et al. |
| 6,372,686 B1 | 4/2002 | Golden |
| 6,395,244 B1 | 5/2002 | Hartweg et al. |
| 6,444,178 B1 | 9/2002 | Hartweg et al. |
| 6,468,941 B1 | 10/2002 | Bortun et al. |
| 6,531,425 B2 | 3/2003 | Golden |
| 6,576,587 B2 | 6/2003 | Labarge et al. |
| 6,605,264 B2 | 8/2003 | Bortun et al. |
| 6,624,113 B2 | 9/2003 | Labarge et al. |
| 6,632,557 B1 | 10/2003 | Curelop et al. |
| 6,652,829 B2 | 11/2003 | Barnes et al. |
| 6,696,389 B1 | 2/2004 | Boegner et al. |
| 6,747,180 B2 | 6/2004 | Ostgard et al. |
| 6,774,080 B2 | 8/2004 | LaBarge et al. |
| 6,858,193 B2 | 2/2005 | Ruwisch et al. |
| 6,915,629 B2 | 7/2005 | Szymkowics |
| 6,938,411 B2 | 9/2005 | Hoffmann et al. |
| 6,948,926 B2 | 9/2005 | Valentine et al. |
| 7,014,825 B2 | 3/2006 | Golden |
| 7,129,194 B2 | 10/2006 | Baca et al. |
| 7,374,729 B2 | 5/2008 | Chen et al. |
| 7,393,809 B2 | 7/2008 | Kim |
| 7,485,273 B2 | 2/2009 | Gandhi et al. |
| 7,563,744 B2 | 7/2009 | Klein et al. |
| 7,576,029 B2 | 8/2009 | Saito et al. |
| 7,641,875 B1 | 1/2010 | Golden |
| 7,749,472 B2 | 7/2010 | Chen et al. |
| 7,772,147 B2 | 8/2010 | Collier et al. |
| 7,785,544 B2 | 8/2010 | Alward et al. |
| 7,803,338 B2 | 9/2010 | Socha et al. |
| 7,875,250 B2 | 1/2011 | Nunan |
| 7,875,573 B2 | 1/2011 | Beutel et al. |
| 7,943,104 B2 | 5/2011 | Kozlov et al. |
| 8,080,494 B2 | 12/2011 | Yasuda et al. |
| 8,148,295 B2 | 4/2012 | Augustine |
| 8,158,551 B2 | 4/2012 | Verdier et al. |
| 8,168,125 B2 | 5/2012 | Choi |
| 8,242,045 B2 | 8/2012 | Kulkarni et al. |
| 8,318,629 B2 | 11/2012 | Alive et al. |
| 8,802,582 B2 | 8/2014 | Malyala et al. |
| 8,845,987 B1 | 9/2014 | Nazarpoor et al. |
| 8,853,121 B1 | 10/2014 | Nazarpoor et al. |
| 8,858,903 B2 | 10/2014 | Nazarpoor |
| 8,969,228 B2 | 3/2015 | Nazarpoor |
| 2001/0001354 A1 | 5/2001 | Peter-Hoblyn et al. |
| 2002/0001554 A1 | 1/2002 | Czarnik et al. |
| 2002/0042341 A1 | 4/2002 | Golden |
| 2002/0114746 A1 | 8/2002 | Roark et al. |
| 2002/0131914 A1 | 9/2002 | Sung |
| 2003/0092566 A1 | 5/2003 | Inoue et al. |
| 2003/0109047 A1 | 6/2003 | Valentine |
| 2003/0126789 A1 | 7/2003 | Valentine et al. |
| 2003/0148235 A1 | 8/2003 | Valentine et al. |
| 2003/0185722 A1 | 10/2003 | Toyoda |
| 2003/0198582 A1 | 10/2003 | Golden |
| 2003/0221360 A1 | 12/2003 | Brown et al. |
| 2004/0018939 A1 | 1/2004 | Chigapov et al. |
| 2004/0033175 A1 | 2/2004 | Ohno et al. |
| 2004/0048125 A1 | 3/2004 | Curelop et al. |
| 2004/0087439 A1 | 5/2004 | Hwang et al. |
| 2004/0098905 A1 | 5/2004 | Valentine et al. |
| 2004/0151647 A1 | 8/2004 | Wanninger et al. |

(56) References Cited

U.S. PATENT DOCUMENTS

| | | |
|---|---|---|
| 2004/0166035 A1 | 8/2004 | Noda et al. |
| 2004/0172876 A1 | 9/2004 | Sprague et al. |
| 2004/0254062 A1 | 12/2004 | Crocker et al. |
| 2005/0095188 A1 | 5/2005 | Matsumoto et al. |
| 2005/0132674 A1 | 6/2005 | Toyoda et al. |
| 2005/0145827 A1 | 7/2005 | McCabe et al. |
| 2005/0160663 A1 | 7/2005 | Valentine |
| 2005/0160724 A1 | 7/2005 | Valentine et al. |
| 2005/0164139 A1 | 7/2005 | Valentine et al. |
| 2005/0188605 A1 | 9/2005 | Valentine et al. |
| 2005/0197244 A1 | 9/2005 | L'vovich et al. |
| 2005/0207956 A1 | 9/2005 | Vierheilig |
| 2005/0217751 A1 | 10/2005 | Valentine et al. |
| 2005/0227867 A1 | 10/2005 | Chen et al. |
| 2005/0265920 A1 | 12/2005 | Ercan et al. |
| 2006/0081922 A1 | 4/2006 | Golden |
| 2006/0100097 A1 | 5/2006 | Chigapov et al. |
| 2006/0120936 A1 | 6/2006 | Alive et al. |
| 2006/0166816 A1 | 7/2006 | Zhang et al. |
| 2006/0223694 A1 | 10/2006 | Gandhi et al. |
| 2006/0228283 A1 | 10/2006 | Malyala et al. |
| 2006/0254535 A1 | 11/2006 | Valentine et al. |
| 2006/0260185 A1 | 11/2006 | Valentine et al. |
| 2006/0292342 A1 | 12/2006 | Ohno et al. |
| 2007/0015656 A1 | 1/2007 | Valentine et al. |
| 2007/0209272 A1 | 9/2007 | Valentine |
| 2007/0283681 A1 | 12/2007 | Makkee et al. |
| 2008/0072705 A1 | 3/2008 | Chaumonnot et al. |
| 2008/0075646 A1 | 3/2008 | Mussmann et al. |
| 2008/0119353 A1 | 5/2008 | Jia et al. |
| 2008/0125308 A1 | 5/2008 | Fujdala et al. |
| 2008/0166282 A1 | 7/2008 | Golden et al. |
| 2008/0190099 A1 | 8/2008 | Yezerets et al. |
| 2008/0210184 A1 | 9/2008 | Valentine et al. |
| 2008/0226524 A1 | 9/2008 | Alive et al. |
| 2009/0004083 A1 | 1/2009 | Valentine et al. |
| 2009/0134365 A1 | 5/2009 | Sasaki et al. |
| 2009/0220697 A1 | 9/2009 | Addiego |
| 2009/0274903 A1 | 11/2009 | Addiego |
| 2009/0304566 A1 | 12/2009 | Golden et al. |
| 2009/0324468 A1* | 12/2009 | Golden et al. ................ 423/210 |
| 2009/0324469 A1 | 12/2009 | Golden et al. |
| 2009/0324470 A1 | 12/2009 | Alamdari et al. |
| 2010/0062293 A1 | 3/2010 | Triantafllyllopoulous et al. |
| 2010/0081563 A1* | 4/2010 | Edgar-Beltran et al. ....... 502/62 |
| 2010/0111796 A1 | 5/2010 | Caudle et al. |
| 2010/0152032 A1 | 6/2010 | Galligan |
| 2010/0168449 A1 | 7/2010 | Grey et al. |
| 2010/0180581 A1 | 7/2010 | Grubert et al. |
| 2010/0184590 A1 | 7/2010 | Althofer et al. |
| 2010/0193104 A1 | 8/2010 | Ryu et al. |
| 2010/0229533 A1 | 9/2010 | Li et al. |
| 2010/0233045 A1 | 9/2010 | Kim et al. |
| 2010/0240525 A1 | 9/2010 | Golden et al. |
| 2010/0266473 A1 | 10/2010 | Chen et al. |
| 2010/0290964 A1 | 11/2010 | Southward et al. |
| 2010/0293929 A1 | 11/2010 | Zhan et al. |
| 2010/0316545 A1 | 12/2010 | Alive et al. |
| 2010/0316547 A1 | 12/2010 | Justice et al. |
| 2011/0053763 A1 | 3/2011 | Verdier et al. |
| 2011/0150742 A1 | 6/2011 | Han et al. |
| 2011/0239626 A1 | 10/2011 | Makkee et al. |
| 2012/0015801 A1 | 1/2012 | Deprez et al. |
| 2012/0039775 A1 | 2/2012 | Schirmeister et al. |
| 2012/0183447 A1 | 7/2012 | Kwan et al. |
| 2013/0012378 A1 | 1/2013 | Meyer et al. |
| 2013/0058848 A1 | 3/2013 | Nunan et al. |
| 2013/0115144 A1 | 5/2013 | Golden et al. |
| 2013/0130032 A1 | 5/2013 | Kuo et al. |
| 2013/0172177 A1 | 7/2013 | Domke et al. |
| 2013/0189173 A1 | 7/2013 | Hilgendorff et al. |
| 2013/0236380 A1 | 9/2013 | Golden et al. |
| 2013/0323145 A1 | 12/2013 | Tran et al. |
| 2014/0018204 A1 | 1/2014 | Nazarpoor et al. |
| 2014/0271384 A1 | 9/2014 | Nazarpoor et al. |
| 2014/0271387 A1 | 9/2014 | Nazarpoor |
| 2014/0271388 A1 | 9/2014 | Nazarpoor et al. |
| 2014/0271390 A1 | 9/2014 | Nazarpoor |
| 2014/0271391 A1 | 9/2014 | Nazarpoor |
| 2014/0271392 A1 | 9/2014 | Nazarpoor |
| 2014/0271393 A1 | 9/2014 | Nazarpoor |
| 2014/0271425 A1 | 9/2014 | Nazarpoor |
| 2014/0274662 A1 | 9/2014 | Nazarpoor |
| 2014/0274663 A1 | 9/2014 | Nazarpoor |
| 2014/0274674 A1 | 9/2014 | Nazarpoor et al. |
| 2014/0274675 A1 | 9/2014 | Nazarpoor |
| 2014/0274677 A1 | 9/2014 | Nazarpoor |
| 2014/0274678 A1 | 9/2014 | Nazarpoor |
| 2014/0298714 A1 | 10/2014 | Sprague |
| 2014/0301906 A1 | 10/2014 | Hatfield |
| 2014/0301909 A1 | 10/2014 | Nazarpoor |
| 2014/0301926 A1 | 10/2014 | Hatfield |
| 2014/0301931 A1 | 10/2014 | Nazarpoor |
| 2014/0302983 A1 | 10/2014 | Nazarpoor |
| 2014/0334978 A1 | 11/2014 | Hatfield |
| 2014/0334989 A1 | 11/2014 | Nazarpoor et al. |
| 2014/0334990 A1 | 11/2014 | Nazarpoor |
| 2014/0335625 A1 | 11/2014 | Hatfield |
| 2014/0335626 A1 | 11/2014 | Hatfield |
| 2014/0336038 A1 | 11/2014 | Nazarpoor et al. |
| 2014/0336044 A1 | 11/2014 | Nazarpoor et al. |
| 2014/0336045 A1 | 11/2014 | Nazarpoor et al. |
| 2014/0356243 A1 | 12/2014 | Nazarpoor |
| 2014/0357475 A1 | 12/2014 | Nazarpoor et al. |
| 2014/0357479 A1 | 12/2014 | Nazarpoor et al. |
| 2014/0360164 A1 | 12/2014 | Sprague et al. |
| 2014/0364303 A1 | 12/2014 | Hatfield |
| 2015/0004709 A1 | 1/2015 | Nazarpoor |
| 2015/0005157 A1 | 1/2015 | Nazarpoor et al. |
| 2015/0005158 A1 | 1/2015 | Nazarpoor et al. |
| 2015/0005159 A1 | 1/2015 | Nazarpoor |
| 2015/0017082 A1 | 1/2015 | Nazarpoor |
| 2015/0018202 A1 | 1/2015 | Nazarpoor et al. |
| 2015/0018203 A1 | 1/2015 | Nazarpoor et al. |
| 2015/0018205 A1 | 1/2015 | Nazarpoor et al. |
| 2015/0031268 A1 | 1/2015 | Waites et al. |
| 2015/0050742 A1 | 2/2015 | Nazarpoor |
| 2015/0051067 A1 | 2/2015 | Nazarpoor et al. |
| 2015/0105242 A1 | 4/2015 | Nazarpoor et al. |
| 2015/0105243 A1 | 4/2015 | Nazarpoor et al. |
| 2015/0105245 A1 | 4/2015 | Nazarpoor et al. |
| 2015/0105246 A1 | 4/2015 | Nazarpoor et al. |
| 2015/0105247 A1 | 4/2015 | Nazarpoor et al. |
| 2015/0147239 A1 | 5/2015 | Launois et al. |
| 2015/0147251 A1 | 5/2015 | Nazarpoor et al. |
| 2015/0148215 A1 | 5/2015 | Nazarpoor |
| 2015/0148216 A1 | 5/2015 | Nazarpoor et al. |
| 2015/0148220 A1 | 5/2015 | Nazarpoor |
| 2015/0148222 A1 | 5/2015 | Nazarpoor |
| 2015/0148223 A1 | 5/2015 | Nazarpoor et al. |
| 2015/0148224 A1 | 5/2015 | Nazarpoor et al. |
| 2015/0148225 A1 | 5/2015 | Nazarpoor et al. |
| 2015/0182951 A1 | 7/2015 | Nazarpoor |
| 2015/0182954 A1 | 7/2015 | Nazarpoor |
| 2015/0196902 A1 | 7/2015 | Golden et al. |
| 2015/0238940 A1 | 8/2015 | Nazarpoor et al. |
| 2015/0238941 A1 | 8/2015 | Nazarpoor et al. |
| 2015/0258496 A1 | 9/2015 | Hatfield et al. |
| 2015/0290627 A1 | 10/2015 | Nazarpoor et al. |
| 2015/0290630 A1 | 10/2015 | Nazarpoor |
| 2015/0352494 A1 | 12/2015 | Hatfield et al. |
| 2015/0352529 A1 | 12/2015 | Nazarpoor et al. |
| 2015/0352531 A1 | 12/2015 | Hatfield et al. |
| 2015/0352532 A1 | 12/2015 | Hatfield et al. |
| 2015/0352533 A1 | 12/2015 | Hatfield et al. |
| 2016/0023188 A1 | 1/2016 | Nazarpoor |
| 2016/0030885 A1 | 2/2016 | Hatfield |
| 2016/0047751 A1 | 2/2016 | Pless et al. |
| 2016/0082422 A1 | 3/2016 | Nazarpoor |
| 2016/0121304 A1 | 5/2016 | Nazarpoor |
| 2016/0121308 A1 | 5/2016 | Nazarpoor et al. |
| 2016/0121309 A1 | 5/2016 | Nazarpoor et al. |
| 2016/0136617 A1 | 5/2016 | Nazarpoor et al. |
| 2016/0136618 A1 | 5/2016 | Nazarpoor et al. |

(56) References Cited

U.S. PATENT DOCUMENTS

| | | | |
|---|---|---|---|
| 2016/0136619 | A1 | 5/2016 | Nazarpoor et al. |
| 2016/0136620 | A1 | 5/2016 | Nazarpoor et al. |
| 2016/0136621 | A1 | 5/2016 | Nazarpoor et al. |

FOREIGN PATENT DOCUMENTS

| | | |
|---|---|---|
| CN | 102371153 | 3/2012 |
| EP | 0022349 | 1/1981 |
| EP | 0450987 | 10/1991 |
| EP | 0541271 | 5/1993 |
| EP | 0605142 | 7/1994 |
| EP | 0 814 241 | 12/1997 |
| EP | 1121981 | 8/2001 |
| EP | 1 232 790 | 8/2002 |
| EP | 1 256 382 | 11/2002 |
| EP | 1 656 993 | 5/2006 |
| EP | 2441510 | 4/2012 |
| JP | 62-20613 | 1/1987 |
| JP | 4-215853 | 8/1992 |
| JP | 09-271665 | 10/1997 |
| JP | 4144174 | 9/2008 |
| JP | 2013-27858 | 2/2013 |
| PL | 404146 | 12/2014 |
| WO | WO 90/07561 | 7/1990 |
| WO | WO 94/11467 | 5/1994 |
| WO | WO 95/02655 | 1/1995 |
| WO | WO 97/04045 | 2/1997 |
| WO | WO 97/09523 | 3/1997 |
| WO | WO 97/28358 | 8/1997 |
| WO | WO 97/36676 | 10/1997 |
| WO | WO 98/22209 A1 | 5/1998 |
| WO | WO 98/28070 A1 | 7/1998 |
| WO | WO 00/30739 A1 | 6/2000 |
| WO | WO 00/75643 A1 | 12/2000 |
| WO | WO 01/85876 A1 | 11/2001 |
| WO | WO 03/068363 A1 | 8/2003 |
| WO | WO 2004/058641 A1 | 7/2004 |
| WO | WO 2008/099847 | 8/2008 |
| WO | WO 2009/139860 A1 | 11/2009 |
| WO | WO 2010/029431 | 3/2010 |
| WO | WO 2011/068509 A1 | 6/2011 |
| WO | WO 2012/093600 | 7/2012 |
| WO | WO 2012/166514 | 12/2012 |
| WO | WO 2013004814 | 1/2013 |
| WO | WO 2013/028575 | 2/2013 |
| WO | WO 2013/044115 | 3/2013 |
| WO | WO 2013068243 | 5/2013 |
| WO | WO 2013121112 | 8/2013 |
| WO | WO 2013153081 | 10/2013 |
| WO | WO 2014/194101 A1 | 12/2014 |
| WO | WO 2015/199687 A1 | 12/2015 |
| WO | WO 2015/199688 A1 | 12/2015 |
| WO | WO 2016/039747 A1 | 3/2016 |

OTHER PUBLICATIONS

D. Panayotov, "Interaction Between NO, CO and 02 on gamma-AL203-Supported Copper-Manganese Oxides", 1996, React.Kinet. Catal.Lett. vol. 58, No. 1, 73-78.
Tanaka et al., "Influence of preparation method and additive for Cu—Mn spinel oxide catalyst on water gas shift reaction of reformed fuels", Applied Catalysis A: General 279 (2005) 59-66.
Papavasilious et al., "Combined Steam reforming of methanol over Cu—Mn spinel oxide catalysts", Journal of Catalysis 251 (2007) 7-20.
Mestres et al., Phase Diagram at Low Temperature of the System Zr02/Nb205, Z.Znorg. Alig. Chem., 2001, 627, 294-298.
Non-Final Office Action for U.S. Appl. No. 13/849,169 issued Mar. 6, 2014.
Hayes et al., "Introduction to Catalytic Combustion", pp. 310-313, 1997 OPA (Overseas Publishers Association).
Alini, S. et al., *Development of new catalysts for N2O-decomposition from adipic acid plant*, Applied Catalysis B: Environmental, 70, (2007) 323-329 plant, Applied Catalysis.
Azad et al. *Examining the Cu-Mn-O Spinel System as an Oxygen Carrier in Chemical Looping Combustion*, Energy Technology, vol. 1, Issue 1, (2013) 59-69.
Barrett, E. P. et al., *The determination of pore volume and area distributions in porous substances. I. Computations from nitrogen isotherms*, J. A. Chem. Soc. (1951) 73, 373-.
Brunaubr, S. et al., *Adsorption of Gases in Multimolecular Layers*, J. Am. Chem. Soc. 1938, 60, 309-319.
Bugarski, Aleksandar, *Exhaust Aftertreatment Technologies for Curtailment of Diesel Particulate Matter and Gaseous Emissions*, Diesel Aerosols and Gases in Underground.
Extended European Search Report for corresponding European Application No. 09770546.1 dated Sep. 26, 2012, 6 pages.
Extended European Search Report for corresponding European Application No. 09770547.9 dated Dec. 7, 2012, 5 pages.
He, H. et al., *An invenstigation of NO/CO reaction over perovskite-type oxide La0.8Ce0.2B0.4Mn0.6O3 (B=Cu or Ag) catalysts synthesized by reverse microemulsion*.
International Preliminary Report on Patentability (Chapter II) from International Application No. PCT/US2009/003800, dated May 11, 2010.
International Search Report and Written Opinion for corresponding International Application No. PCT/US2009/003799, dated Oct. 8, 2009.
International Search Report and Written Opinion for corresponding International Application No. PCT/US2009/003800 dated Oct. 22, 2009.
International Search Report and Written Opinion for corresponding International Application No. PCT/US2014/030597 dated Aug. 13, 2014.
International Search Report and Written Opinion for corresponding International Application No. PCT/US2014/033041 dated Aug. 20, 2014.
International Search Report and Written Opinion for corresponding International Application No. PCT/US2014/037452 dated Sep. 15, 2014.
International Search Report and Written Opinion for corresponding International Application No. PCT/US2014/044221, dated Oct. 3, 2014.
International Search Report and Written Opinion for corresponding International Application No. PCT/US2014/044222 dated Oct. 3, 2014.
International Search Report and Written Opinion for corresponding International Application No. PCT/US2014/046512 dated Apr. 6, 2015.
International Search Report and Written Opinion for corresponding International Application No. PCT/US2014/054874, dated Nov. 13, 2014.
International Search Report and Written Opinion for corresponding International Application No. PCT/US2014/055063 dated Nov. 24, 2014.
International Search Report and Written Opinion for corresponding International Application No. PCT/US2014/067541 dated Feb. 4, 2015.
International Search Report and Written Opinion for corresponding International Application No. PCT/US2014/067569, dated Apr. 3, 2015.
International Search Report and Written Opinion for corresponding International Application No. PCT/US2014/067589, dated Feb. 10, 2015.
International Search Report and Written Opinion for corresponding International Application No. PCT/US2015/025267 dated Jul. 2, 2015.
International Search Report and Written Opinion for corresponding International Application No. PCT/US2015/025299 dated Jul. 2, 2015.
Ishizaki, K. et al., *A Study of PGM-Free Oxidation Catalyst YMnO3 for Diesel Exhaust Aftertreatment*, SAE Technical Paper, (2012) http://papers.sae.org/2012-01-0365/.

(56) References Cited

OTHER PUBLICATIONS

Kucharczyk, B. et al., *Partial substitution of lanthanum with silver in the LaMnO3 perovskite: Effect of the modification on the activity of monolithic catalysts in the.*

Reddy et al., *Selective Ortho-Methylation of Phenol with Methanol over Copper Manganese Mixed-Oxide Spinel Catalysts*, Journal of Catalysis, vol. 243 (2006) 278-291.

Suh, J. K. et al., *Characterization of transition metal-impregnated La-Al complex oxides for catalytic combustion*, Microporous Materials (1995) 657-664.

Wei, P. et al., *In situ high-temperature X-ray and neutron diffraction of Cu-Mn oxide phases*, J. Mater Sci. (2010) 45: 1056-1064.

\* cited by examiner

OPTIMIZATION OF ZERO-PGM WASHCOAT AND OVERCOAT LOADINGS ON METALLIC SUBSTRATE

CROSS-REFERENCE TO RELATED APPLICATIONS

This application is related to U.S. Ser. No. 13/927,953, entitled Optimization of Zero-PGM Metal Loading on Metallic Substrate, filed Jun. 26, 2013, the entirety of which is incorporated by reference herein.

BACKGROUND

1. Field of the Disclosure

The present disclosure relates generally to ZPGM catalytic systems, and more particularly to optimization of Zero-PGM washcoat, and overcoat loadings on metallic substrates.

2. Background Information

The behavior of catalyst systems may be controlled primarily by the properties of washcoat, and overcoat loadings. The catalyst materials produced by conventional methods may fail to provide a catalyst layer having good adhesion and cohesion properties. Another drawback may be achieving the proper adhesion of a washcoat to a substrate and/or adhesion of a washcoat to an overcoat. A plurality of factors may affect the adhesion of a washcoat to a substrate and/or of an overcoat to a washcoat, which may include, but are not limited to employing a suitable substrate dimension and cell density, washcoat and overcoat particle size, suitable formulation, and optimized loading of washcoat and overcoat.

For example, the washcoat adhesion, surface area, reactivity, porosity, thermal conductivity, and mechanical integrity of the washcoat at elevated temperatures may be considered. The washcoat and overcoat loadings processes employed by conventional methods, may fail to provide a catalyst layer, for producing good washcoat adhesion and cohesion properties. Therefore, there is a need to address these drawbacks, and other shortcomings associated with traditional catalyst materials and processes.

For the foregoing reasons, may be highly desirable to have a process for optimization of washcoat and overcoat loadings on metallic substrates, which may produce improvements for washcoat adhesion, and enhanced performance of HC and CO conversion for controlling exhaust emissions, achieving similar or better efficiency than existing oxidation catalysts systems.

SUMMARY

The present disclosure relates to optimization of Zero-PGM washcoat (WC) and overcoat (OC) loadings on metallic substrates, including the total loading of WC and OC in order to optimize the washcoat adhesion (WCA) loss, for producing uniform coating, and enhanced HC and CO conversion, improving performance of ZPGM catalyst systems.

At present disclosure, a ZPGM catalyst system may include a metallic substrate, a WC and an OC. WC may include support oxide such as alumina and ZPGM catalyst such as silver. OC includes ZPGM such as copper oxide, and ceria, support oxide such as alumina. ZPGM catalyst system may include at least one OSM. The ZPGM catalyst system may be prepared using co-milling, co-precipitation, or other preparation technique known in the art. The WC and OC loading may vary from 60 g/L to 200 g/L, separately.

The present disclosure may relate to optimization of WC and OC total loading, therefore the ZPGM metal loading in WC and OC, such as silver and copper will be considered to be constant. Since, the ratio of cerium and copper may be constant, therefore when copper loading is fixed, cerium loading may be calculated.

According to an embodiment, the present disclosure may determine the optimization parameters of total WC and OC loadings, for achieving optimum WC:OC ratio based on regression models.

The present disclosure may provide solutions to increase performance of HC and CO conversion and minimized the WCA loss by optimization of the ratio between WC and OC loadings.

A substantial increase in HC and CO conversion from discharge of exhaust gases of internal combustion engines, may be achieved by having good correlation between total WC and OC loadings, for enhanced catalyst activity and performance.

Further advantages of the present disclosures may be evident to those skilled in the art, or may become evident upon reading the detailed description of related embodiments, as shown in accompanying drawings.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

Figure 1A:
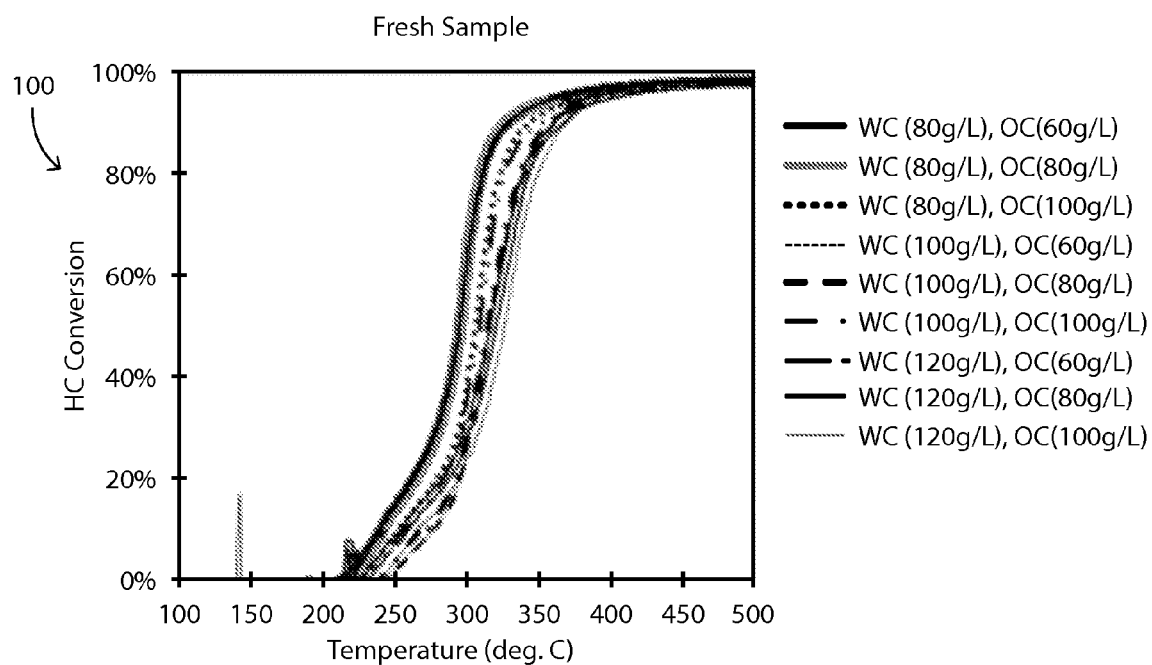
FIG. 1 shows HC light-off test results for HC conversion of fresh and aged samples with different WC and OC loadings under exhaust lean condition, according to an embodiment.

The present disclosure hereby described in detail with reference to embodiments illustrated in drawings, which form a part hereof. Other embodiments may be used and/or and other changes may be made without departing from the spirit or scope of the present disclosure. The illustrative examples described in detailed description are not meant to be limiting the subject matter presented herein.

DEFINITIONS

All scientific and technical terms used in the present disclosure may have meanings commonly used in the art, unless otherwise specified. The definitions provided herein, are to facilitate understanding of certain terms used frequently and are not meant to limit the scope of present disclosure.

As used herein, the following terms may have the following definitions:

"Catalyst system" refers to a system of at least three layers, which may include at least one substrate, a washcoat, and an optional overcoat.

"Substrate" refers to any suitable material for supporting a catalyst and can be of any shape or configuration, which yields sufficient surface area for deposition of washcoat.

"Washcoat" refers to at least one coating including at least one oxide solid which may be deposited on a substrate.

"Overcoat" refers to at least one coating including one or more oxide solid which may be deposited on at least one washcoat.

"Oxide solid" refers to any mixture of materials selected from the group including a carrier material oxide, a catalyst, and a mixture thereof.

"Carrier material oxide" refers to materials used for providing a surface for at least one catalyst.

"Oxygen storage material" refers to materials that can take up oxygen from oxygen-rich feed streams and release oxygen to oxygen-deficient feed streams.

"ZPGM Transition metal catalyst" refers to at least one catalyst which may include at least one transition metal completely free of platinum group metals.

"Exhaust" refers to discharge of gases, vapor, and fumes created by and released at the end of a process, including hydrocarbons, nitrogen oxide, and carbon monoxide.

"Conversion" refers to the change from harmful compounds (such as hydrocarbons, carbon monoxide, and nitrogen oxide) into less harmful and/or harmless compounds (such as water, carbon dioxide, and nitrogen).

"Correlation" refers to relationship between two variables.

"T50" refers to the temperature at which 50% of a material is converted.

DESCRIPTION OF DRAWINGS

In the following detailed description, reference is made to the accompanying illustrations, which form a part hereof. On these illustrations, which are not to scale or to proportion, similar symbols typically identify similar components, unless context dictates otherwise. The illustrative examples described in the detailed description, are not meant to be limiting. Other examples may be used and other changes may be made without departing from the spirit or scope of the present disclosure.

General Description of Washcoat (WC) and Overcoat (OC)

In the present disclosure, WC generally includes at least one ZPGM transition metal catalyst, such as silver, and carrier material oxides, such as $Al_2O_3$. Moreover, according to an embodiment of the present disclosure, OC may include not only ZPGM transition metal catalysts such as copper, rare earth metals such as cerium, and carrier material oxides, but also oxygen storage materials (OSM's). Alternative embodiments may include $CeO_2$, $ZrO_2$, and $TiO_2$, among others, as carrier material oxides. Furthermore, other embodiments of the present disclosure may include other materials. WC or OC materials and ZPGM catalysts may be deposited on a substrate in a single step, employing a co-milling process, or may be synthesized by a suitable chemical technique, such as co-precipitation or any other suitable technique known in the art.

The present disclosure may relate to optimization of WC and OC total loading, therefore the ZPGM metal loading in WC and OC, such as silver and copper will be considered to be constant. Since, the ratio of cerium and copper may be constant, therefore when copper loading is fixed, cerium may be calculated.

The proper combination of these elements may produce uniform coatings, improving quality of catalyst systems, including but not limited to optimization of washcoat adhesion, as well as increasing conversion of hydrocarbon and carbon monoxide.

Preparation of Samples

A ZPGM catalyst system including a ZPGM transition metal catalyst having a metallic substrate, a WC and an OC may be prepared. Metallic substrate may be used with different dimension and cell density (CPSI). At present disclosure, a metallic substrate with D 40 mm×L 40 mm and 300 CPSI is used. WC may include an oxygen storage material (OSM) and support oxide. Additionally, WC may include silver as transition metal. The total amount of silver may be of about 1% by weight to about 20% by weight of the total catalyst weight, preferably 5.5 g/L. OC includes copper oxide, ceria, support oxide, and at least one OSM, which may be a mixture of cerium (Ce), zirconium (Zr), neodymium (Nd), and praseodymium (Pr). The support oxide may include any type of alumina or doped alumina. The OSM and the alumina may be present in WC in a ratio between 40% and about 60% by weight. The alumina and OSM included in OC are present in a ratio of about 60% to about 40% by weight. The copper (Cu) and Ce in OC are present in about 5% to about 50% by weight, preferably 6.5 g/L Cu and 7.8 g/L Ce. The ZPGM catalyst system may be prepared using co-milling, co-precipitation, or other preparation technique known in the art. After deposition, WC and OC may be calcined (fired). This thermal treatment may be performed at about 300° C. to about 700° C. In some embodiments this heat treatment may be performed at about 550° C. The heat treatment may last from about 2 to about 6 hours. In an embodiment the heat treatment may last about 4 hours. However, the ramp of heat treatment may vary in some embodiments. The WC and OC loading may vary from 60 g/L to 200 g/L, separately.

Optimization of Total WC and OC Loadings on Metallic Substrates

According to an embodiment of the present disclosure may refer to processes to achieve optimization of total WC and OC loadings. Benefits derived from optimizations, may include increasing conversion of HC and CO and reducing the washcoat adhesion loss.

Extensive testing, experiments, and calculations have been performed for determination of optimum WC and OC loadings on metallic substrates, for achieving optimization of total loading of the catalyst including WC and OC loadings with fixed loading of base metal in order to optimize the adhesion load of WCA, and also for producing uniform coating, and improving performance of the catalyst for enhanced HC and CO conversion.

The following examples are intended to illustrate the formulation variations, which may be employed to optimize the scope of the present disclosure. Other procedures known to those skilled in the art may be used alternatively.

Example #1 may illustrate formulation for maintaining the same WC loading of 80 g/L, and variations of OC loadings at 60 g/L, 80 g/L, and 100 g/L according to Table 1. The influence of such variation on activity of HC and CO conversion and WCA loss may be measured.

TABLE 1

| EXAMPLE # | WC LOADING | OC LOADING |
|---|---|---|
| Example # 1 | 80 g/L | 60 g/L |
| Example # 1A | 80 g/L | 80 g/L |
| Example # 1B | 80 g/L | 100 g/L |

Example #2 may illustrate formulation for maintaining the same WC loading of 100 g/L, and variations of OC loadings at 60 g/L, 80 g/L, and 100 g/L according to Table 2. The influence of such variation on activity of HC and CO conversion and WCA loss may be measured.

TABLE 2

| EXAMPLE # | WC LOADING | OC LOADING |
|---|---|---|
| Example # 2 | 100 g/L | 60 g/L |
| Example # 2A | 100 g/L | 80 g/L |
| Example # 2B | 100 g/L | 100 g/L |

Example #3 may illustrate formulation for maintaining the same WC loading of 120 g/L, and variations of OC loadings at 60 g/L, 80 g/L, and 100 g/L according to Table 3. The influence of such variation on activity of HC and CO conversion and WCA loss may be measured.

TABLE 3

| EXAMPLE # | WC LOADING | OC LOADING |
|---|---|---|
| Example # 3 | 120 g/L | 60 g/L |
| Example # 3A | 120 g/L | 80 g/L |
| Example # 3B | 120 g/L | 100 g/L |

Correlation Between Total Loadings of WC, OC, and Catalyst Activity

The catalysts prepared in example #1, example #2, and example#3 are tested under exhaust lean condition with toluene as hydrocarbon feed. The test was performed by increasing the temperature from about 100° C. to about 500° C., at a temperature rate of 40° C. per minute. In case of aged samples, the catalysts are aged at 900° C. for 4 hours under dry air condition.

As may be seen in FIG. 1, the graphs for HC conversion, may illustrate different variations of fresh and aged samples of WC and OC loadings prepared in example #1 to 3. The data of light-off test results 100 can be used to determine the total WC and OC loadings which results in highest HC conversion. In FIG. 1A the graphs for HC conversion for fresh samples, may illustrate the difference between highest and lowest HC T50 for fresh samples, which is 32 C. The lowest HC T50 corresponds to example 1 and 1A with at T50 of 294° C. However, the highest HC T50 corresponds to example 3B with a HC T50 of 326° C. The HC light-off test result 100 for fresh samples may indicate that total WC and OC loading has impact on fresh HC conversion.

Figure 1B:
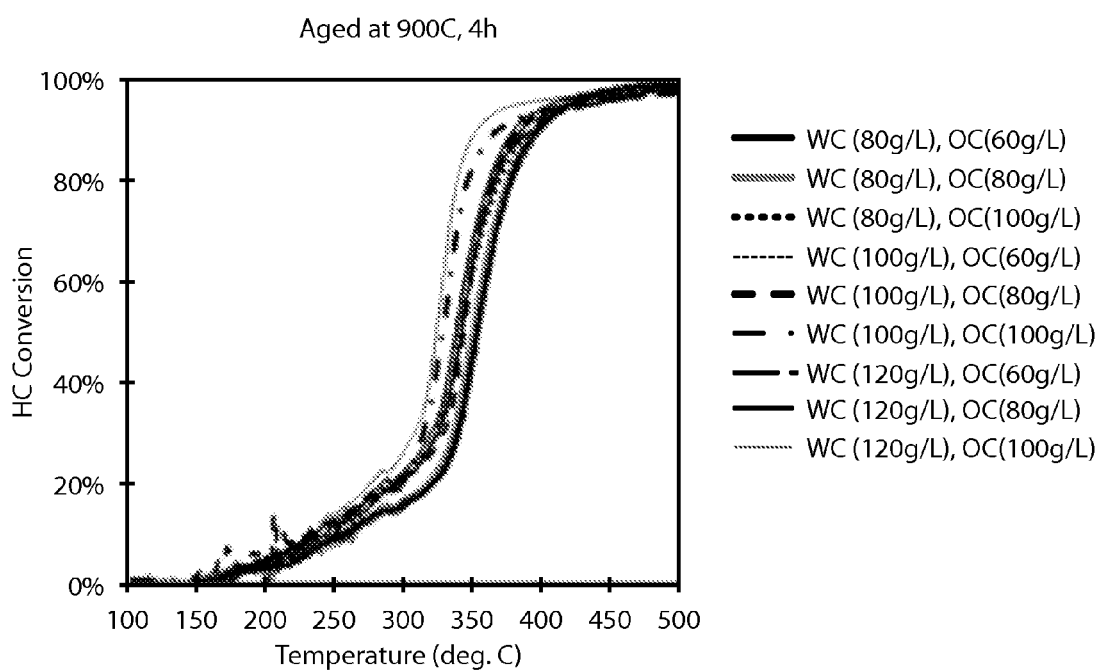

FIG. 1B illustrates the difference between highest and lowest HC T50 for aged samples, which is 28 C. The lowest HC T50 corresponds to example 3B with at T50 of 321° C. However, the highest HC T50 corresponds to example 1 with HC T50 of 349° C. In addition, a regression model may be employed for determination of optimum correlation between total WC and OC loadings and HC T50 conversion for fresh and aged samples.

According to an embodiment, light-off test results 100 may employ a regression model for correlation determination between total WC and OC loadings and HC T50 conversion. The standard deviation coefficient $R^2$ may have a value of 0.90 and 0.97 for fresh and aged samples, respectively, which meant 90% of data for fresh samples can be explained by the model and 97% of data for aged samples can be explained by the model, having good correlation between total WC and OC loadings and HC T50. Therefore, the light-off test result 100 for fresh and aged samples indicate that total WC and OC loading has impact on aged HC conversion.

As may be seen in light-off test results 200 in FIG. 2, the graphs for CO conversion, may illustrate activity of fresh and aged samples with different WC and OC loadings prepared in example #1 to 3. The data of light-off test results 200 may be used to determine the optimum total WC and OC loadings which results in better CO conversion.

Figure 2A:
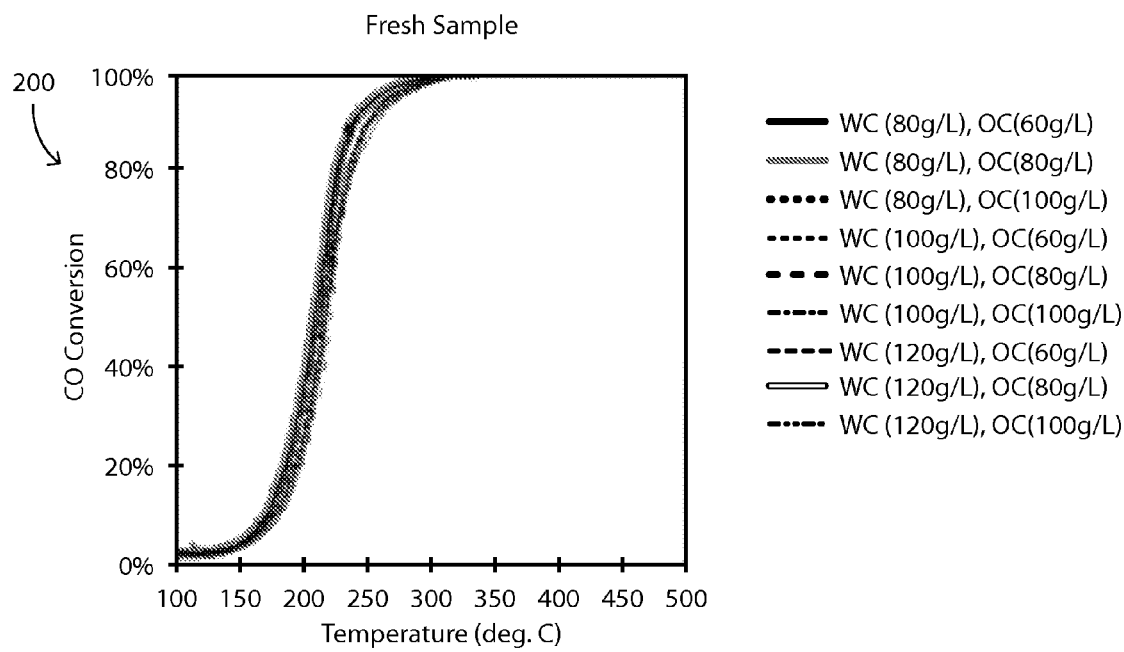
FIG. 2 shows CO light-off test results for CO conversion of fresh and aged samples with different WC and OC loadings under exhaust lean condition, according to an embodiment.

In FIG. 2A, the graphs for CO conversion, may illustrate the difference between highest and lowest CO T50 for fresh samples, which is 14° C. The lowest CO T50 corresponds to example 1A with at T50 of 208° C. However, the highest CO T50 corresponds to example #3B with a CO T50 of 222° C. The CO light-off test result 200 for fresh samples may indicate that total WC and OC loading does not have significant impact on CO conversion of fresh samples.

Figure 2B:
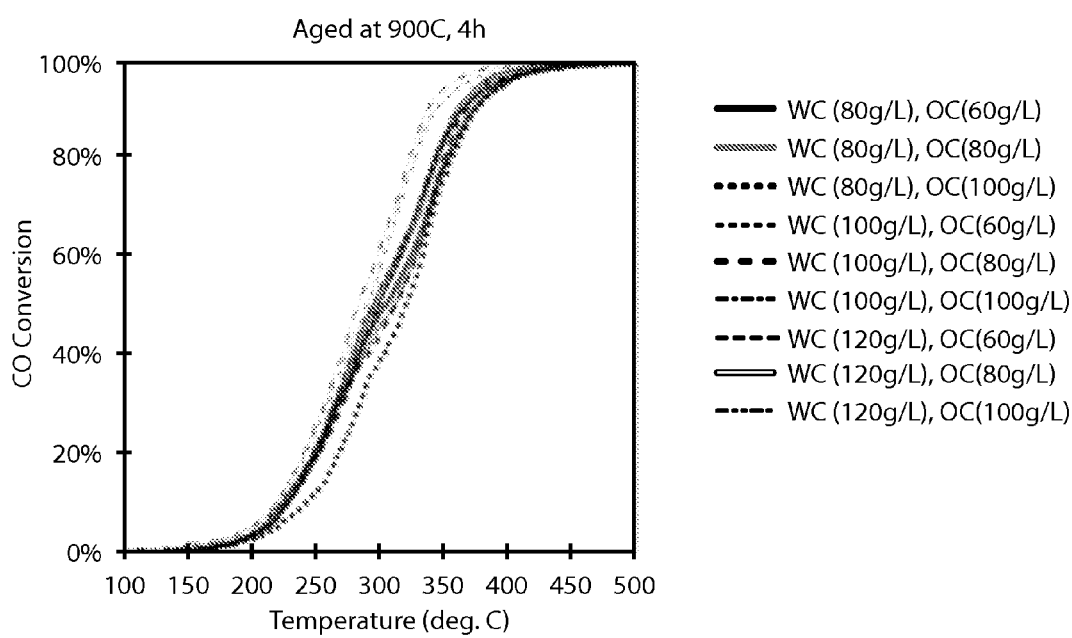

For aged samples, the catalysts are aged at 900° C. for 4 hours under dry air condition. FIG. 2B illustrates that the difference between highest and lowest CO T50 for aged samples is 38° C. The lowest HC T50 corresponds to example 3B with at T50 of 282° C. However, the highest CO T50 corresponds to example 1B with HC T50 of 320° C. In addition, a regression model may be employed for determination of optimum correlation between total WC and OC loadings and CO T50 conversion for aged samples. The light-off test result 200 for aged samples indicate that total WC and OC loading has impact on CO conversion of aged samples.

According to an embodiment, light-off test results 200 may employ a regression model for correlation determination between total WC and OC loadings and CO T50 conversion for aged samples. The standard deviation coefficient $R^2$ for aged samples have a value of 0.90, which meant 90% of data can be explained by the model. Therefore, the light-off test result 200 for aged samples indicate that total WC and OC loading has impact on CO conversion of aged samples.

Correlation Between Total WC-OC Loadings and Washcoat Adhesion (WCA) Loss

Table 4, shows test results of WCA loss for variations of WC and OC total loading for fresh samples, which can be prepared according to parameters as shown in example #1, example #2 and example #3.

The washcoat adhesion test is performed by quenching the preheated substrate at 550° C. to cold water with angle of 45 degree for 8 seconds followed by re-heating to 150° C. and then blowing cold air at 2,800 L/min. Subsequently, weight loss may be measured to calculate weight loss percentage, which is % WCA loss in present disclosure.

In table 4, may be seen results of WCA loss and variations of WC and OC total loading for fresh samples. The loading of ZPGM metal is fixed in both WC and OC for all samples, including 5.5 g/L Ag in WC and 6.5 g/L Cu in OC. Benefits derived from these experiments, may demonstrate that highest WCA loss correspond to samples with lowest OC loading (60 g/L) and lowest washcoat adhesion loss corresponds to samples with highest OC loading (100 g/L). For fresh samples, the WCA loss obtained from example 3B with WC loading of 120 g/L and OC loading of 100 g/L shows only 0.45% loss.

TABLE 4

| WC | OC (Cu = 6.5 g/L) | | |
|---|---|---|---|
| (Ag = 5.5 g/L) | 60 g/L | 80 g/L | 100 g/L |
| 80 g/L | 4.8 | 3.0 | 1.4 |
| 100 g/L | 4.5 | 1.8 | 0.8 |
| 120 g/L | 4.9 | 1.3 | 0.45 |

Table 4A shows test results of washcoat adhesion loss and variations of WC and OC total loading for aged samples which can be prepared as shown in example #1, example #2, and example #3. The loading of ZPGM metal is fixed in both WC and OC for all samples, including 5.5 g/L Ag in WC and 6.5 g/L Cu in OC.

Aged samples are treated at 900° C. for about 4 hours under dry condition. The results demonstrate that the WCA loss does not affect significantly by aging, even some improvement in WCA can be seen for some samples after aging. Similar to fresh samples, the WCA loss obtained from example 3B with WC loading of 120 g/L and OC loading of 100 g/L shows very low WCA loss (0.9%) for aged sample.

TABLE 4A

| WC | OC (Cu = 6.5 g/L) | | |
|---|---|---|---|
| (Ag = 5.5 g/L) | 60 g/L | 80 g/L | 100 g/L |
| 80 g/L | 3.4 | 2.9 | 2.3 |
| 100 g/L | 1.8 | 1.4 | 1.8 |
| 120 g/L | 2.1 | 1.1 | 0.9 |

Correlation Between Total WC-OC Loadings and HC T50 Conversion

Figure 3:
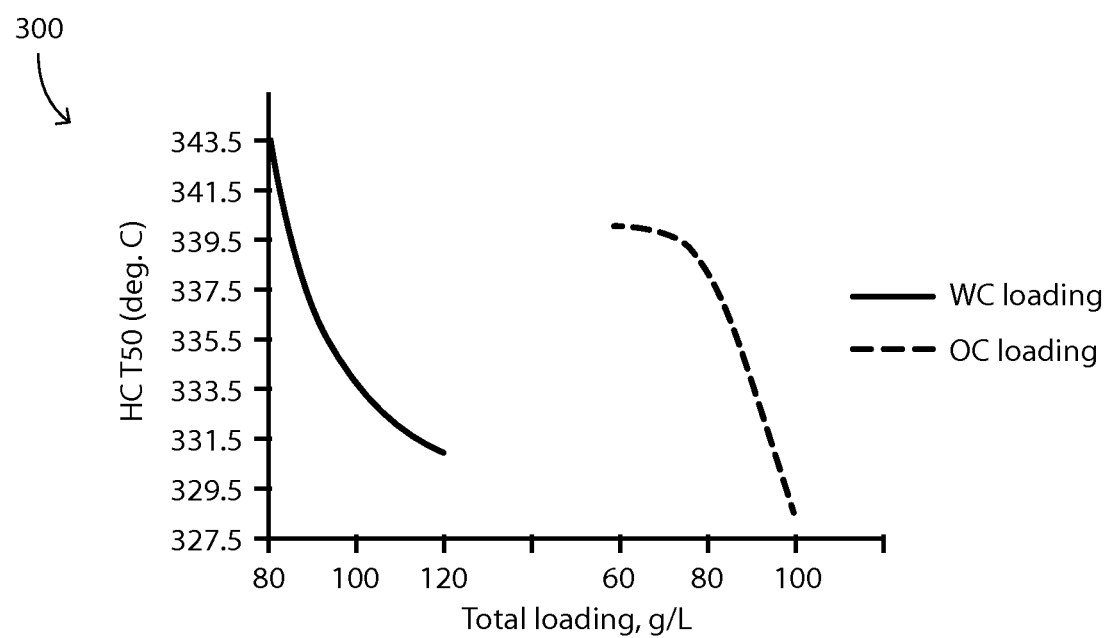
FIG. 3 shows correlation between total WC-OC loadings and HC T50 conversion, according to an embodiment.

FIG. 3 shows correlation 300 between total WC-OC loadings and HC conversion based on regression model, in order to optimize the total WC and OC loadings that leads to increase HC conversion.

The regression model indicates that WC target loading of 80 g/L can produce a HC T50 value of 34° C., and WC target loading of 120 g/L can produce a HC T50 value of 331° C., showing that variations of total WC loadings can affect the performance of HC conversion. Higher WC loading improves the HC conversion. Also, FIG. 3 shows OC loading with target loading of 60 g/L, can produce a HC T50 value of 340° C., while an OC target loading of 100 g/L can produce a HC T50 value of 328° C. Therefore, a higher loading of OC improves HC conversion. The data obtained from foregoing values, shows those variations of total WC and OC loadings to 120 g/L and 100 g/L for WC and OC, respectively improves the performance of HC conversion.

Correlation Between Total WC-OC Loadings and WCA Loss

Figure 4:
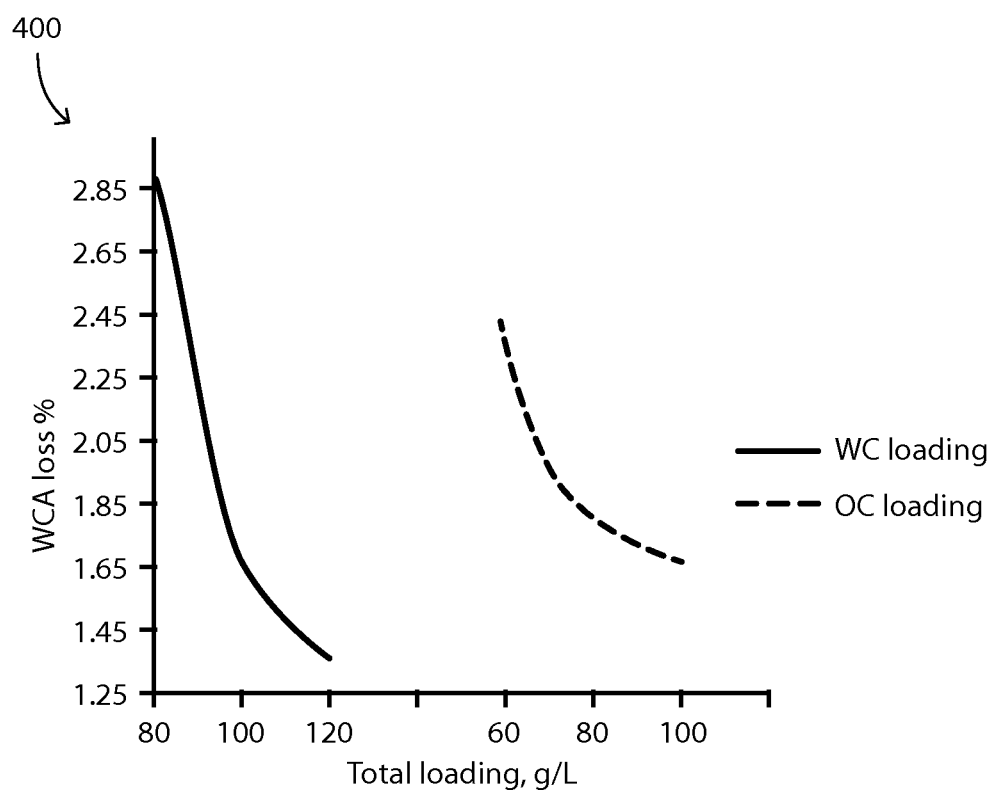
FIG. 4 shows correlation between total WC-OC loadings and WCA, according to an embodiment.

FIG. 4 shows correlation 400 between total WC-OC loadings and WCA loss based on regression model, in order to optimize the total WC and OC loadings that leads to minimum washcoat adhesion loss. FIG. 4 shows variations of total WC, and OC loadings employed for investigation of correlation between total WC-OC loadings and WC adhesion. After experimenting with different parameters variations of WC and OC loadings, as shown in Table 4 and 4A has been determined that in order to optimize washcoat adhesion and catalyst performance, may require to maintain a good correlation between total WC-OC loadings and WC adhesion.

As may be seen in graphs of FIG. 4, correlation 400 indicates that WC target loading of 80 g/L can produce 2.85% WCA loss, while WC target loading of 120 g/L can produce 1.36% WCA loss, showing that by increasing the WC loading the WCA loss decreased.

FIG. 4 also shows that OC with target loading of 60 g/L can produce 2.45% WCA loss, while OC target loading of 100 g/L can produce 1.66% WCA loss, showing that by increasing the OC loading, the WCA loss decreased. Therefore, increasing WC and OC loading to 120 g/L and 100 g/L, respectively will improve the WCA loss to around 1% or below.

Suitable processes may be employed to implement optimization of WC and OC loadings. The optimized WC and OC loading which leads to highest HC and CO conversion and lowest WCA loss is obtained as 120 g/L and 100 g/L for WC and OC respectively. Benefit derived from these optimizations, may enhance removal of main pollutants from exhaust of internal combustion engines, by oxidizing toxic gases with improvement in WCA loss and catalyst performance.

While various aspects of production process may be described in the present disclosure, other aspects, and embodiments may be contemplated. The various aspects and embodiments disclosed here are for purpose of illustration, and are not intended to be limiting with the scope and spirit being indicated by the following claims.

What is claimed is:

1. A method for optimizing a catalytic system, comprising: providing a catalyst system, comprising:
    a substrate;
    a washcoat suitable for deposition on the substrate, comprising at least one first oxide solid comprising alumina and at least one first zero platinum group catalyst comprising silver; and
    an overcoat suitable for deposition on the substrate, comprising at least one second oxide solid selected from the group consisting of a carrier material oxide, at least one second zero platinum group catalyst comprising one selected from the group consisting of copper oxide, ceria, and combinations thereof;
    wherein the amount of the washcoat loading is about 120 g/L and the amount of the overcoat loading is about 100 g/L.

2. The method according to claim 1, wherein the at least one first zero platinum metal group catalyst comprises about 5.5 g/L of silver.

3. The method according to claim 1, wherein at least one second zero platinum metal group catalyst comprises about 6.5 g/L of copper oxide.

4. The method according to claim 1, wherein the washcoat adhesion loss is about 0% to about less than 2%.

5. The method according to claim 1, wherein the washcoat adhesion loss is less than about 2%.

6. The method according to claim 1, wherein the washcoat adhesion loss is less than 2.0%.

7. The method according to claim 1, wherein the washcoat adhesion loss is less than 1.0%.

8. The method according to claim 1, wherein the substrate is metallic.

9. The method according to claim 1, wherein the overcoat further comprises at least one oxygen storage material.

10. The method according to claim 1, wherein the carrier material oxide is selected from the group consisting of $CeO_2$, $ZrO_2$, $TiO_2$, and combinations thereof.

11. The method according to claim 1, wherein the at least one second zero platinum group catalyst comprises copper oxide and ceria.

12. The method according to claim 1, wherein the overcoat further comprises at least one oxygen storage material comprising cerium, zirconium, neodymium, and praseodymium.

13. The method according to claim 1, wherein at least one second zero platinum metal group catalyst comprises about 7.8 g/L of ceria.

14. The method according to claim 1, wherein the at least one first zero platinum metal group catalyst comprises about 1% by weight to about 20% by weight of silver.

* * * * *